(12) United States Patent
Fukuda et al.

(10) Patent No.: US 8,244,800 B2
(45) Date of Patent: Aug. 14, 2012

(54) VIRTUAL SPACE SYSTEM, METHOD AND PROGRAM

(75) Inventors: Takashi Fukuda, Yokohama (JP);
Osamu Ichikawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 12/270,515

(22) Filed: Nov. 13, 2008

(65) Prior Publication Data

US 2009/0172089 A1    Jul. 2, 2009

(30) Foreign Application Priority Data

Nov. 14, 2007    (JP) .................................. 2007-295377

(51) Int. Cl.
*G06F 15/16* (2006.01)
(52) U.S. Cl. ........ 709/203; 709/219; 707/102; 707/104; 705/10; 705/15
(58) Field of Classification Search .................. 709/203, 709/219; 707/102, 104; 705/10, 15
See application file for complete search history.

(56) References Cited

U.S. PATENT DOCUMENTS

| | | | | |
|---|---|---|---|---|
| 7,039,621 | B2 * | 5/2006 | Agrafiotis et al. | 706/20 |
| 7,065,525 | B1 * | 6/2006 | Sasaki et al. | 369/13.01 |
| 2002/0062360 | A1 * | 5/2002 | Ishiguro | 709/219 |
| 2003/0115211 | A1 * | 6/2003 | Chen et al. | 707/102 |
| 2004/0193441 | A1 * | 9/2004 | Altieri | 705/1 |
| 2006/0053163 | A1 * | 3/2006 | Liu et al. | 707/104.1 |
| 2007/0198178 | A1 * | 8/2007 | Trimby et al. | 701/209 |
| 2009/0030774 | A1 * | 1/2009 | Rothschild et al. | 705/10 |

FOREIGN PATENT DOCUMENTS

JP    2002-157209    5/2002

* cited by examiner

*Primary Examiner* — Thuong Nguyen
(74) *Attorney, Agent, or Firm* — William Stock; Anne Vachon Dougherty

(57) ABSTRACT

In a virtual space including a plurality of islands, location of the islands is mapped in two dimensions, preferably using multidimensional scaling such as Kruskal method, to keep the order of the distances between the feature vector including the information of profile and preference of the user and the feature vectors including the profiles and event information of the respective islands. The map server uses the mapping information to provide the user with the islands arranged in a manner more conforming to the user's feature vector, which allows the user to conveniently visit the islands suited to the user's preference, and hence, increases utilization of the virtual space.

10 Claims, 8 Drawing Sheets

VIRTUAL SPACE SYSTEM, METHOD AND PROGRAM

FIELD OF THE INVENTION

The present invention generally relates to a virtual space system, method and program for administering and operating a virtual space. More particularly, the present invention relates to a technique of improving convenience of the users accessing a virtual space.

BACKGROUND OF THE INVENTION

In the three-dimensional (3D) Internet virtual space such as Second Life™ of Linden Research Inc., a virtual world having various characteristic objects and functions is developed by the virtual space provider and the users logging into the virtual space.

In the MMORPG (Massively Multiplayer Online Role-Playing Game) such as Final Fantasy™ Online of Square Enix or Ragnarok Online™ of Gravity Corporation, a wide virtual world is prepared by the provider, allowing the user to enjoy it immediately after the login.

In contrast, in the user-constructed type virtual world such as Second Life, the users construct the virtual world by each providing buildings and/or objects offering various functions on a local virtual space called a "SIM" or an "island". The collection of these islands constitutes a whole virtual world. The islands are separated by the sea or roads. In the example of Second Life, one SIM or island is usually made up of one server, and has an area of 256 m×256 m in a virtual size in the virtual world. However, the SIMs are clearly different from each other, with a wide variety of buildings constructed therein, objects, purposes of setting up, language used, and others.

In the general Internet environment other than those of the above-described MMORPGs and Second Life where avatars roam within the virtual spaces, a user needs to search using a search engine or click on a document link provided in a document, to reach a desired site. By comparison, in the 3D Internet, each avatar walks within the virtual space or flies and sees from above to find and reach an island the user is interested in. Further, on the way to a certain island, the avatar may see neighboring islands and expand the interest.

In the user-constructed type virtual space, however, the positional relationship between the neighboring islands is determined in accordance with convenience of the provider or the purchasers of the islands, and once determined, the contents of the objects and services in the island are fixed and not changed unless the owner of the island leaves. As such, in the conventional virtual space, it would be difficult for the user to act as an avatar and roam or fly in accordance with the user's feelings and preference to find an interesting island.

Japanese Unexamined Patent Publication (Kokai) No. 2002-157209 discloses a technique of supporting creation of a home page, in which a town having a certain form of lifestyle is constructed in a 3D virtual space by arranging facilities required for daily life such as financial institutions, medical institutions, shopping malls, recreational facilities, public facilities and the like, the 3D virtual space constituted as a completed island or city is downloaded from a server-side database to a user-side terminal, and the user is allowed to move a character along a virtual road formed in the island to enter and use a desired facility, and also allowed to select or exchange other facilities prepared on the database as required, so that the user can create the home page having an island or town having the form of lifestyle adapted to his/her own taste.

Japanese Unexamined Patent Publication (Kokai) No. 2002-157253 discloses a system capable of providing related information, based on user's place preference information and area conditions input by the user, in accordance with the possibility of reaching within a reasonable time as well as a physical distance from the place where the information recipient lives or the place that he/she is interested in.

The above-described techniques, however, would not support an avatar wandering in a virtual world to find a partial virtual space or an island suited to his/her interest.

SUMMARY OF THE INVENTION

The present invention has been accomplished to solve the conventional problems as described above, and it is an object of the present invention to provide a technique of allowing a user to readily visit a local virtual space or an island in a virtual space according to the user's profile or request.

The inventors have conceived that the above problems can be solved by relocating individual local virtual worlds (islands) on another larger virtual space by reflecting the user's profile and request. Such relocation allows the user to quickly and readily find the required (or desired) information. For example, islands primarily related to amusement are arranged close to each other to create a large amusement complex.

The present invention determines the positional relationship between the neighboring islands in a two-dimensional space based on the distances between a feature vector reflecting the user's profile and feature vectors representing cultures/characteristics of the respective islands.

In summary, this involves the following procedure.

(1) The basic information on each island is extracted as a feature vector. Basically, one feature vector is prepared for one island. The basic information on the island includes the information regarding currency and language used in the island, an event held on the island, date, time and place where the event is held, and profile of the island's owner.

(2) Next, a user's feature vector is determined in accordance with the user's profile. This reflects the user's attributes and preferences, such as language used, gender, age, occupation, residence, hometown, academic background, and others.

(3) Location of the islands is determined taking into consideration the distance relationship between the user's feature vector and the feature vectors of the respective islands. This means that the location in the two-dimensional space is determined from the distance relationship of the multidimensional vectors, and for the determination of the location, a method based on multidimensional scaling (MDS) is preferably used.

The information regarding location of the islands or local virtual spaces in the two-dimensional space for each user thus obtained is stored in a server of the virtual world. When the particular user logs into the virtual space, the islands or local virtual spaces are relocated using the location information in the two-dimensional space unique to the user stored in the server, and presented to the user. This allows the user, once he/she logs into the virtual space, to visit a plurality of islands conveniently, based on the map of the islands optimally arranged in accordance with the user's profile.

According to the present invention, the islands or local virtual spaces are relocated in association with the profile or request of the user as described above, to allow the user to easily obtain information of the similar category. For example, although the users interested in music may be considered to be closely related to each other, one may be interested in classical music, while the other may be interested in jazz. Thus, there may be a case where while location of the islands in the virtual space may be preferable for one user, the same may not be preferable for the other user. Accordingly, it is very important what kinds of characteristics are shared by the neighboring islands in the virtual space in response to the user's profile.

By application of the present invention, the positive feelings of the user on the virtual space increases, and hence, the virtual space becomes crowded with an increased number of users signing in, and as a result, the system provider of the virtual space as well as the owners who hold events on the islands will enjoy increased profits therefrom.

DETAILED DESCRIPTION OF THE INVENTION

Figure 1:
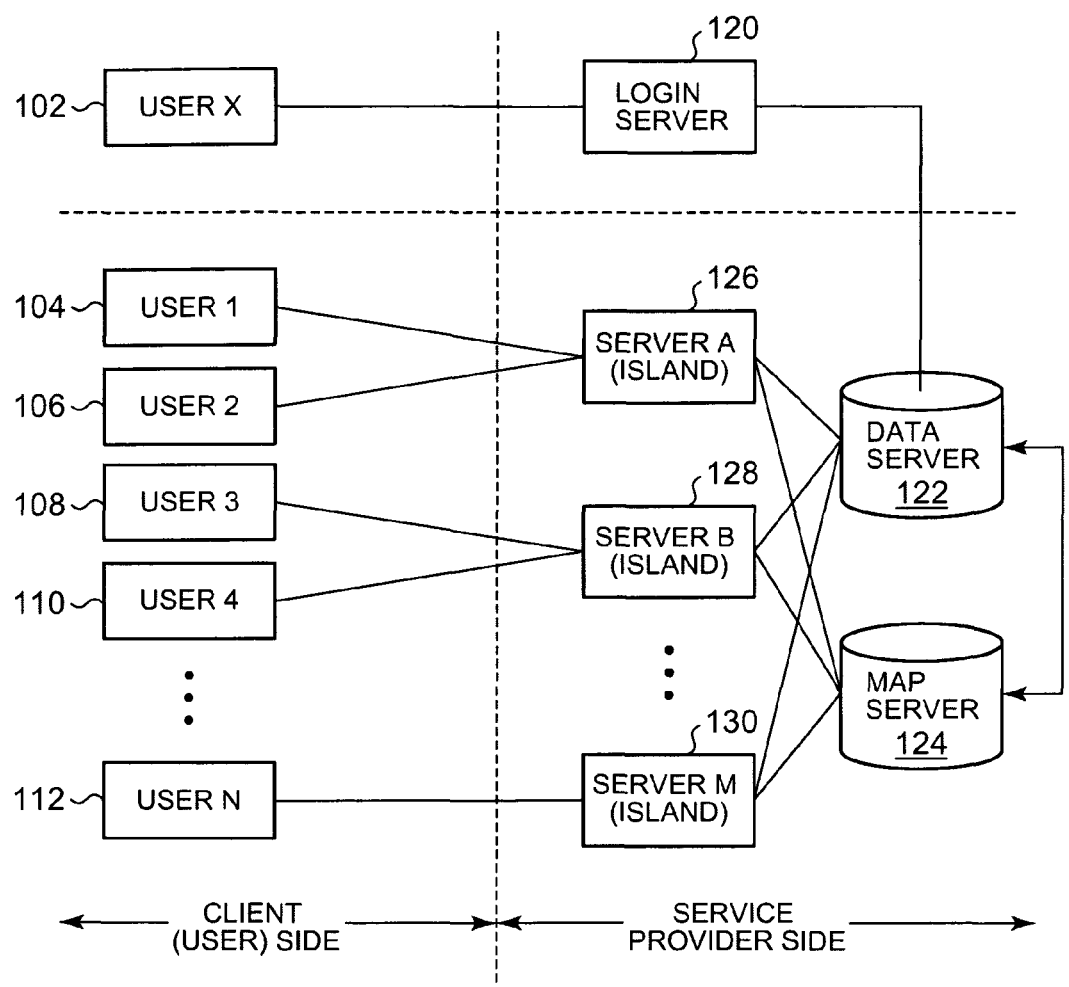
FIG. 1 is a block diagram showing how the client computers and the server computers are connected for accessing a virtual world.

An embodiment of the present invention will now be described with reference to the drawings. Throughout the drawings like reference characters denote like objects unless otherwise specified. It will be appreciated that the following description is of an embodiment of the present invention, which is not intended to restrict the invention to the contents described in the embodiment.

FIG. 1 is a schematic block diagram showing the hardware configuration for implementing the technique of the present invention. In FIG. 1, the left side corresponds to the client (user) side, in which client computers 102, 104, 106, 108, 110, and 112 of individual users are shown. The right side corresponds to the service provider side, in which a login server 120, a data server 122, a map server 124, and servers 126, 128, and 130 for respective islands (local virtual spaces) are shown.

In FIG. 1, the data server 122 stores the following information, including the information on the components of the respective islands (objects' information, number and types), which is updated as appropriate.
  Information on each user
    personal information including name, age, gender, date of birth, nationality and others
    other profile including hobbies, skills and others
    user ID, password
  Information on avatar
    gender, figure, face, hair style, clothes, accessories and others
  Information on currency
  Information on events held in each island
    access management list for each island
    list of objects including buildings created or constructed on each island
    date, time, and place where event is held.

The user's personal information and profile described above are preferably acquired by requesting the user to input them on a prescribed input screen (not shown) at the time when the user newly applies for an account in the virtual world system. Thereafter, if there is any change in personal information or profile on the user side, the user may voluntarily reenter the information from a prescribed menu to change the profile.

In the map server 124, the following information is stored, which is updated as appropriate.
  Positional relationship of islands (original coordinates, position coordinates of the islands after being mapped for each user)
  Position coordinates of avatar (indicating where in which island the avatar is staying)
  Information on bridge connecting islands (coordinates, connection point or the like, which information is saved for each user)

The position coordinates of the islands after being mapped for each user constitute the concept characteristic to the present invention, which will be described later in detail.

For a given user X to play an active role in the virtual world system, firstly, the client computer 102 of the user X needs to log into the virtual world system. In the present embodiment, the user accesses the virtual world system via a browser dedicated to the virtual world, which may be downloaded from a prescribed URL. The user downloads and installs the browser to the user's client computer in advance. When the user starts the browser dedicated to the virtual world, the login server 120 communicates with the browser and requests the user ID assigned to the user and password.

If the user does not have user ID or password yet, the user goes through the procedure of acquiring an account in the virtual world system. When the user enters his/her user ID and password, the login server 120 checks the appropriate sets of user IDs and passwords prestored in the user server 122, and if the set of user ID and password input by the user is found, it authenticates the user as a proper user. Thereafter, the user is connected to the server administering and operating the island on which the user's avatar is staying, based on the information stored in the data server 122 and the map server 124. FIG. 1 shows the state where the users 1 and 2 are connected to the server A, the users 3 and 4 are connected to the server B, . . . , and the user N is connected to the server M. That the users 1 and 2 are connected to the server A, for example, means that the users 1 and 2 are staying on the island A.

As described above, at least a part of the information on the objects and events in the individual islands is stored in the data server 122. The information on the islands is thus administered in an integrated manner on the data server 122 so that the information on the events and objects may be administered globally for the entire virtual world system. To this end, the data server 122 frequently communicates with the servers 126, 128, . . . , 130 of the respective islands.

The map server 124 provides a user with a map of the islands with respect to the user when the user moves from a current island to another island. The map can be considered as a view of a location of a plurality of islands relative to the user. That is, if the activities of the user's avatar are limited within one island, the information of the map of the islands provided by the map server 124 is unessential; the same has a substantial meaning when the avatar sees the location of the islands from above while flying from one island to another island.

In a preferred embodiment of the present invention, such a map is prepared for each user, based on the profile of the individual user.

Now, referring to FIG. 2, description will be made for a hardware block diagram of the client computer, which is shown by the reference characters 102, 104, ..., 112 in FIG. 1.

Figure 2:
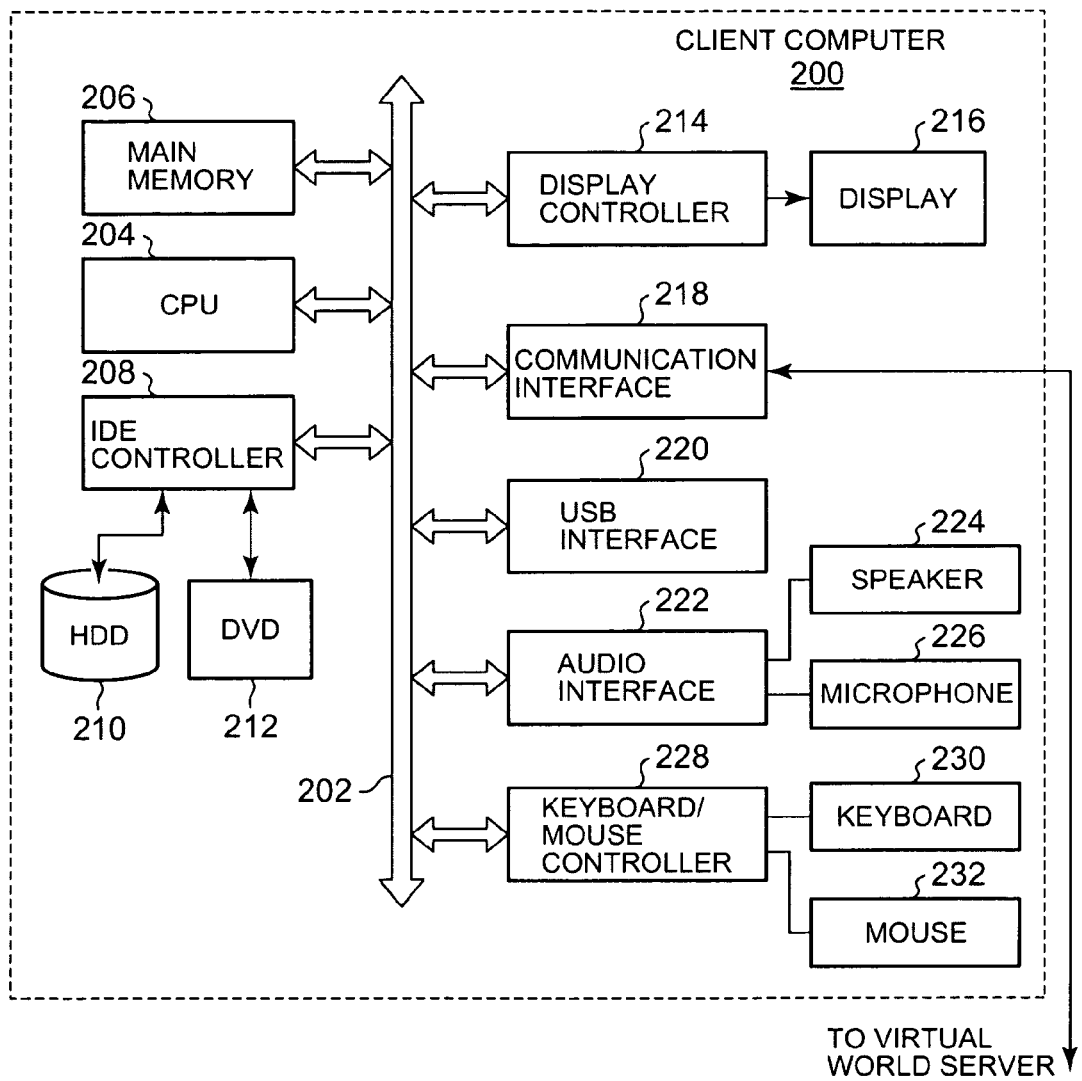
FIG. 2 is a block diagram showing the more detailed configuration of the client computer.

In FIG. 2, the client computer, corresponding to each of the blocks 102, 104 and others in FIG. 1, has a main memory 206, a CPU 204, and an IDE (Integrated Drive Electronics) controller 208, which are connected to a bus 202. Further connected to the bus 202 are a display controller 214, a communication interface 218, a USB interface 220, an audio interface 222, and a keyboard/mouse controller 228. The IDE controller 208 is connected with a hard disk 210 and a DVD drive 212. The DVD drive 212 is used as required for introducing a program from a CD-ROM or DVD. The display controller 214 is connected with a display 216 having an LCD screen. On the display 216, avatars and objects transmitted from the virtual world server connected thereto are rendered. In the present embodiment, the rendering is carried out on the client side, not on the server side.

To the USB interface 220, a dedicated controller having special buttons, an acceleration sensor device and others are connected as required, which are used for conveniently manipulating the avatars in the virtual world.

The audio interface 222 is connected with a speaker 224 and a microphone 226. With the client computer provided with the speech synthesis function, in the virtual world, the contents of the chat of the avatar of the other user can be output in the form of sound from the speaker 224. Further, with the computer provided with the speech recognition function, in the virtual world, what the user speaks to the microphone 226 can be converted to text by the speech recognition function and transmitted as the contents of the chat to the avatar of the other user.

The keyboard/mouse controller 228 is connected with a keyboard 230 and a mouse 232. The keyboard 230 is typically used for writing a chat message in the virtual world. The keyboard 230 is also used, when a dedicated controller is not used, to cause the avatar to jump or move. The mouse 232 is used to select or execute an operation from a menu, or confirm or set attributes of the objects in the virtual world.

The CPU 204 is a CPU based upon 32-bit or 64-bit architecture. For example, Intel's Pentium™ 4 or AMD's Athlon™ may be used.

The hard disk 210 at least stores an operating system and a virtual world browser (not shown) running on the operating system, and the operating system is loaded to the main memory 206 at the startup of the system. The operating system may be Windows XP™, Windows Vista™, or Linux™.

The communication interface 218 communicates with the virtual world server under Ethernet protocol, for example, using the TCP/IP communication function provided by the operating system.

Figure 3:
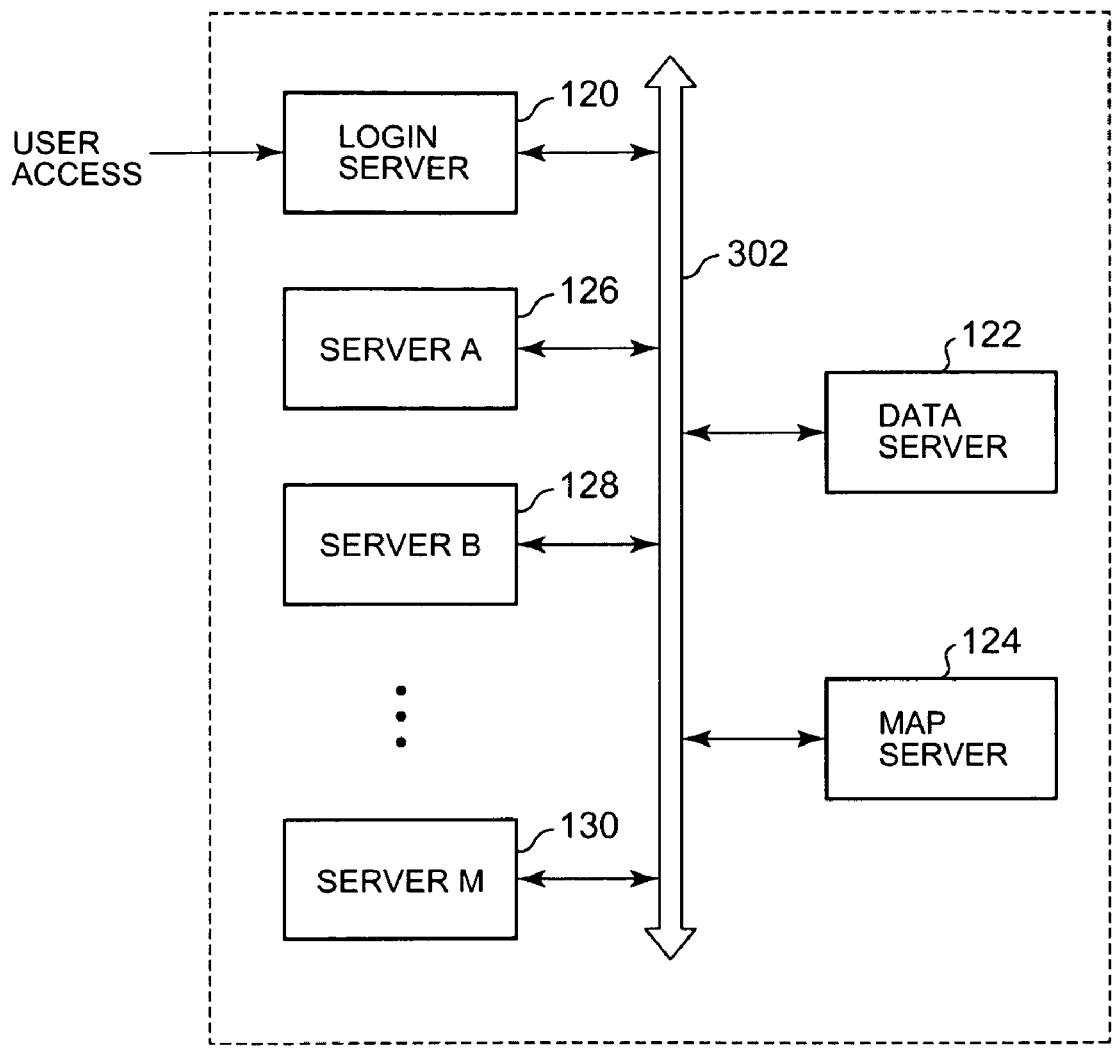
FIG. 3 is a block diagram showing the configuration in the server.

FIG. 3 is a schematic block diagram showing the hardware configuration of the virtual world service provider side. As shown in FIG. 3, a login server 120, a server (A) 126, a server (B) 128, ..., a server (M) 130, a data server 122, and a map server 124 are connected to a communication path 302, and the servers are capable of communicating with each other via the communication path 302. 1000 BASE-T Ethernet™, of which speed is 1000 Mbps, is suitable for the communication between these servers.

For the servers, IBM™ System X, System i, and System p available from International Business Machines Corporation may be used, although they are not limited thereto.

Figure 4:
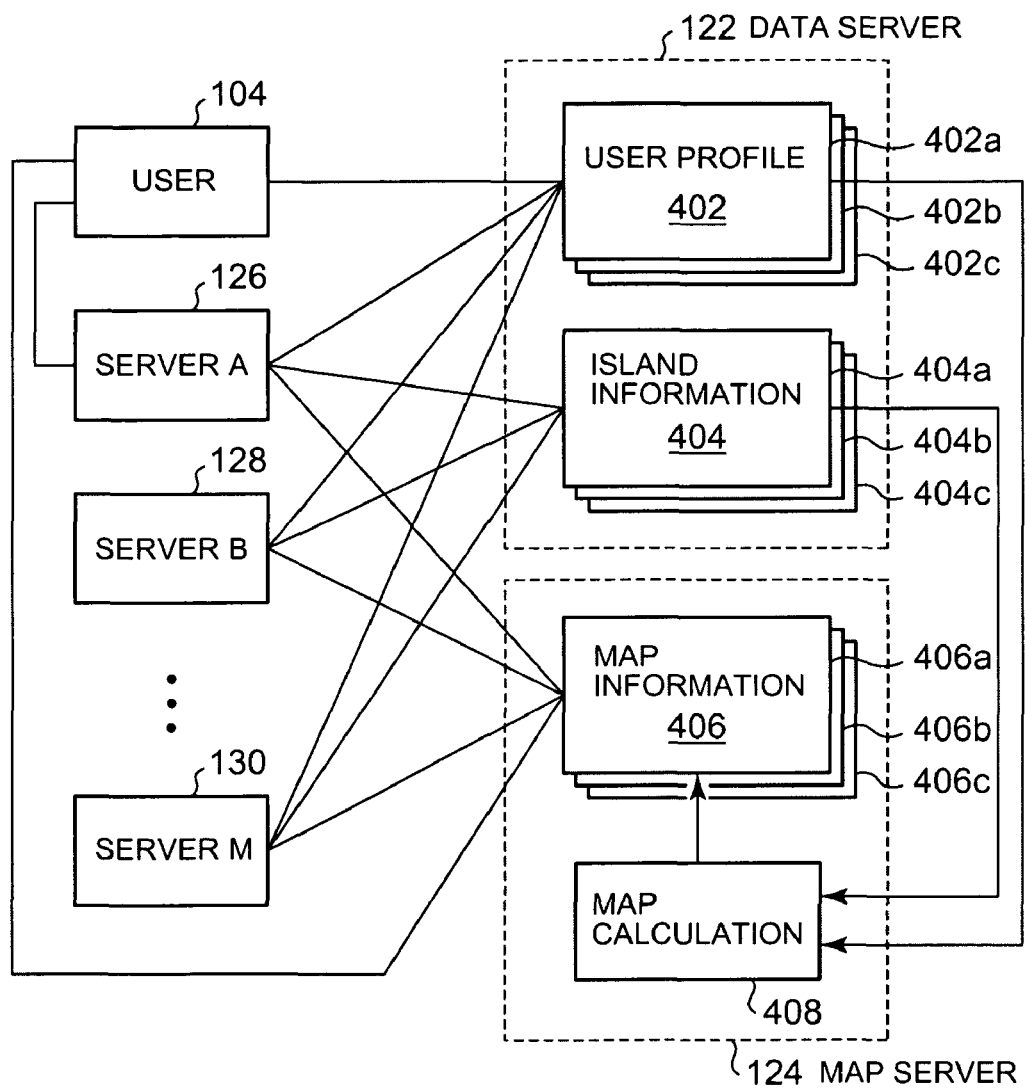
FIG. 4 shows logical blocks in the server.

FIG. 4 is a schematic block diagram showing the logical configuration of the virtual world service provider side. As shown in FIG. 4, the data server 122 stores in its disk (not shown) a user profile 402 and island information 404 for the virtual world. The user profile 402 consists of user profiles 402a, 402b, 402c, ... of the respective users. One user profile includes the information of: gender, age, occupation, residence, hometown, family structure, academic background, user ID, password, and information on the avatar (gender, figure, face, hairstyle, clothes, and accessories of the avatar). Preferably, the user profile further includes the information of: sports, music, real estate holdings, stocks, and others. The information in the user profile is input and stored when the user answers inquiries when applying for an account with the virtual world service provider, or is additionally input by the user afterwards.

Alternatively, the user profile may be extracted automatically using, e.g., the technique disclosed in Japanese Unexamined Patent Publication (Kokai) No. 2005-235014 filed by the applicant of the present invention.

The island information 404 consists of information 404a, 404b, 404c, ... of the respective islands. The island information includes such information as currency circulating in the island, an access management list, a list of objects such as buildings created or constructed on the island, and event information such as date, time, and place where the event is held. Preferably, the island information is updated to the latest information through communication between the data server and the servers of the respective islands.

The map server 124 stores in its disk (not shown) mapping information 406 and a map calculation module 408 for calculating the mapping information 406. The mapping information 406 consists of mapping information 406a, 406b, 406c, ... corresponding to the respective users. When a user logs into the virtual world service, the mapping information provides the user with the map of the location of the islands that the user sees. Preferably, the mapping information includes, besides the location of the islands, information on boundaries of the islands including roads, sea and the like, as well as information on the avatars staying in the respective islands, in the mapped space.

The map calculation module 408 uses the user profile 402 and the island information 404 to calculate the mapping information 406. More specifically, the mapping information 406a for a certain user is calculated using the user profile 402a corresponding to the user and the island information 404a, 404b, 404c, ... of the respective islands. Similarly, the mapping information 406b for another user is calculated using the user profile 402b corresponding to the user, and the island information 404a, 404b, 404c, ... of the respective islands. The calculation process of the map calculation module 408, which constitutes a feature of the present invention, will be described later in detail.

It is noted that the login server 120 is not shown in FIG. 4 because, once the user logs into the virtual world through the login server 120, it can be considered that the user is now directly connected to the server of the island on which the user is staying, with the login server 120 passed through.

The server (A) 126, server (B) 128, ..., server (M) 130 of the respective islands access the data server 122, as necessary, to acquire the information of the user profile 402, which includes the information on the avatars of the users. The server (A) 126, server (B) 128, . . . , server (M) 130 of the respective islands use the information to transmit the model information of the avatars on the corresponding islands to the client computer 200 (FIG. 2) of the logged-in user, and the client computer 200 in turn draws an image on the display 216 by the rendering function of the virtual space browser (not shown) that is stored in its disk 210 and loaded to the main memory 206.

Further, the server (A) 126, server (B) 128, . . . , server (M) 130 of the respective islands access the data server 122, as necessary, to update the information 404 on the corresponding islands.

Still further, the server (A) 126, server (B) 128, . . . , server (M) 130 of the respective islands access the map server 124, as necessary, to update the mapping information 406. The client computer accesses the mapping information 406 corresponding to the user on the map server 124, to acquire the information. The acquired mapping information is used when the client computer draws the view including a plurality of islands, for example in the case where the user of the client computer flies in the sky and has a bird's eye view of the islands, or when the user walks along a road bridging the islands. The similar condition takes place in the case where the scenery of the neighboring islands appears even if the user remains on an island. That is, the client computer distinguishes the information on the islands to be drawn on the screen of the client computer from the mapping information and from the current position of the avatar of the user acquired from the server, and issues a request for the drawing data to the map server 124. In response to the request, the map server 124 issues a request for data for drawing to the corresponding islands, and when it receives the data, it returns them to the client computer that issued the original request. The client computer renders the contents regarding the islands based on the received data.

Figure 5:
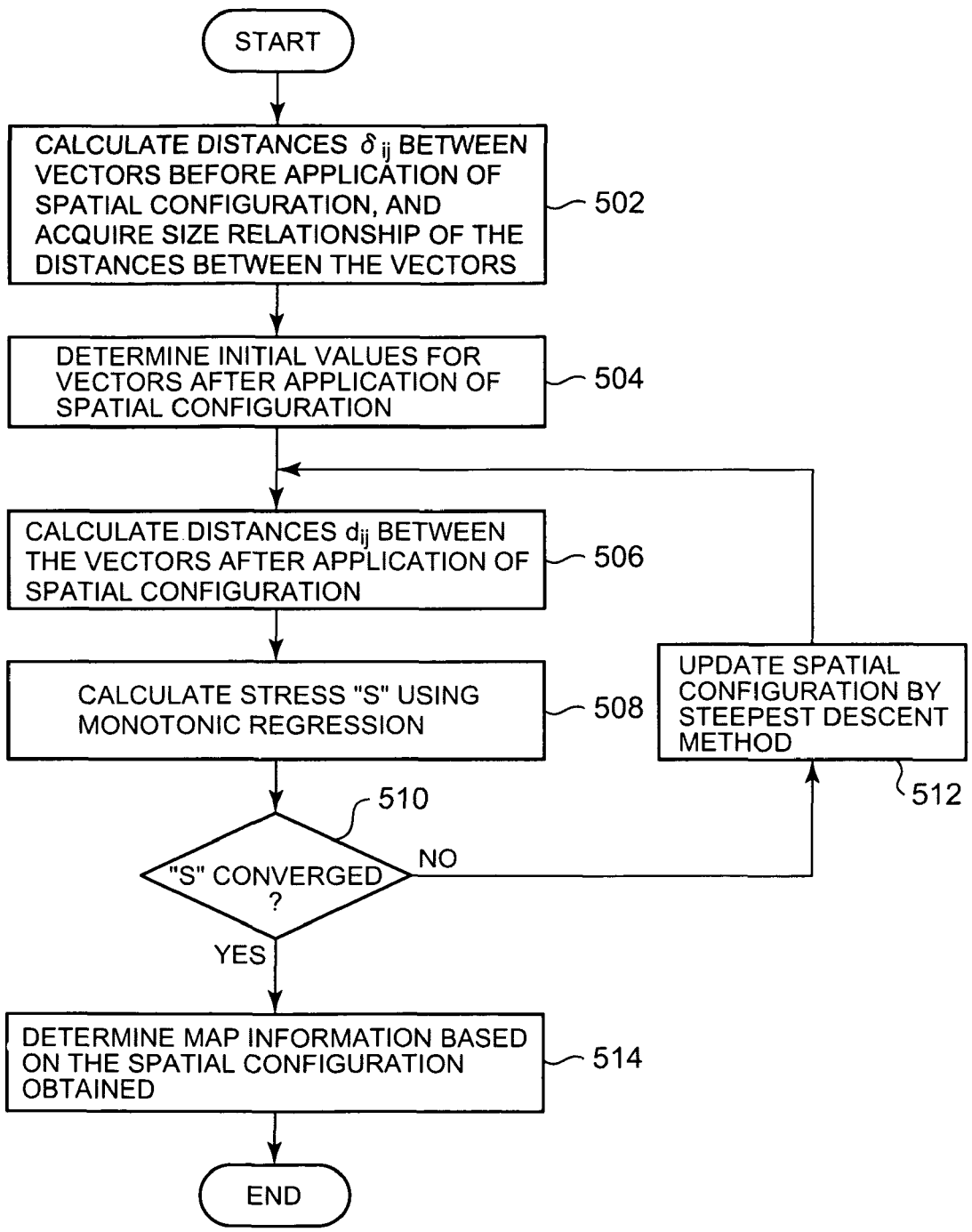
FIG. 5 is a flowchart illustrating the processing of generating mapping information.

The process for generating the mapping information 406 will now be described with reference to the flowchart in FIG. 5. The processing according to the flowchart in FIG. 5 is carried out by the map calculation module 408 shown in FIG. 4. Before explanation of the processing in FIG. 5, feature vectors used in the mapping information 406 will be described. Here, a feature vector of a user is as follows.

X=(nationality: Japan=13, language: Japanese=12, gender: male=1, swimming: 0, soccer: 1, baseball: 0, classical music: 0, . . . )

These values of the user may be acquired based on the inquiries to the user upon creation of the account and also based on the histories of visiting and purchasing products on the Internet Web sites, and the values of the feature vector may be updated regularly based on the history of activities within the virtual space after opening of the account.

A feature vector including the similar items is generated for each island as well. Basically, the feature vector of the island is generated based on the information 404 of the island stored in the data server 122. The following is an example thereof.

Y=(nationality: U.S.A.=1, language: English=1, gender: none=−1, swimming: 1, soccer: 0, baseball: 1, classical music: 0, . . . )

Theses values of the island may be determined based on the information of the profile of the owner of the island, history of the events held on the island, history of the avatars that visited the island, and others, and is preferably updated automatically and regularly. It is noted that "not applicable" may be expressed by entering a special value indicating the same, as in "gender: none=−1" above.

Since the elements of the feature vectors have their values varying in size, the values of the respective elements may be normalized to reduce the effects of the differences of the absolute values. Alternatively, the values may be weighted differently to attach greater weights on specific elements. In the present embodiment, multidimensional scaling (MDS) is used to determine how to arrange the islands on a two-dimensional space in conformity with the user's hobbies and preference, as the mapping information 406 (FIG. 4), based on the distances between the user's feature vector X and the feature vectors Y of the respective islands. The multidimensional scaling is a technique of multivariate analysis, with which the relationship between the targets of classification is expressed as a configuration of points in a low-dimensional space. The multidimensional scaling determines the configuration such that the size relationship (i.e., the order) of the distances $d_{i,j}$ between the vectors i and j arranged on a two-dimensional space according to the configuration maintains the order of the distances $\delta_{i,j}$ between the original feature vectors $X^{(i)}$ and $Y^{(i)}$ observed. Particularly, in the present embodiment, Kruskal method is used as the multidimensional scaling method.

Returning to FIG. 5, in step 502, firstly, a set of the feature vector X of a certain user and the feature vectors Y of the respective islands is considered. That is, assuming that there are one feature vector X for a user and N-1 feature vectors Y for the respective islands, the N feature vectors are renumbered to $X^{(i)}$ (i=1 . . . N). With these N feature vectors as the feature vectors before application of a spatial configuration, the distances $\delta_{i,j}$ between the vectors are calculated using the following expression, to determine the order of the distances $\delta_{i,j}$.

$$\delta_{ij} = \sqrt{\sum_{d=1}^{m} \left(X_d^{(i)} - X_d^{(j)}\right)^2} \qquad (1)$$

where m is the number of dimensions of the feature vectors.

In step 504, initial values for vectors after application of the spatial configuration are determined. The initial values of these vectors may be arbitrary, which may be random numbers. Alternatively, the initial values may be provided using the method described on page 110 of the following publication: Takayuki Saito and Hiroshi Yadohisa, "Analysis of Relativity Data—Multidimensional Scaling and Cluster Analysis", published by Kyoritsu Shuppan Co., Ltd., Sep. 10, 2006 (hereinafter, referred to as the "Reference Document").

In step 506, the distances $d_{ij}$ between the vectors after application of the spatial configuration are obtained by the following expression. This expression is called "Minkowski's r-metric", which is normally $r \geq 1$. The case where r=1 corresponds to "Manhattan distance", and the case where r=2 corresponds to "Euclidean distance". Although r=2 in the present embodiment, any value of not less than 1 may be chosen for r.

$$d_{xy} = \left\{\sum_{i=1}^{n} (x_i - y_i)^r\right\}^{\frac{1}{r}} \qquad (2)$$

Further, in the present embodiment, n=2 in the above expression, because the vectors are to be arranged in the two-dimensional space.

In step 508, a variable ∧$d_{ij}$ is calculated using monotonic regression. Hereinafter, this variable is also referred to as "hat $d_{ij}$" for convenience' sake. The monotonic regression is now explained briefly. Firstly, $\delta_{i,j}$ calculated in step 502 are arranged in ascendant order. Then, $d_{ij}$ are arranged corresponding to their subscripts. For example, assuming that $\delta_{i,j}$ are $\delta_{4,5}$, $\delta_{2,1}$, $\delta_{6,3}$, . . . in ascendant order, $d_{ij}$ are also arranged in the corresponding order of $d_{4,5}$, $d_{2,1}$, $d_{6,3}$, . . . , which are not necessarily arranged in ascendant order because $d_{ij}$ are initially assigned random numbers.

If $d_{4,5} < d_{2,1}$, the monotonic relationship with $\delta_{i,j}$ holds, and thus, it is determined that $d_{4,5}$=hat $d_{4,5}$. If $d_{4,5} > d_{2,1}$, however, the monotonic relationship with $\delta_{i,j}$ does not hold, and accordingly, the arithmetic mean of the neighboring terms, $d_{b1}=(d_{4,5}+d_{2,1})/2$, is calculated, and $d_{b1}$ is compared with the next term $d_{6,3}$. If $d_{b1} < d_{6,3}$, it is determined that $d_{b1}$=hat $d_{4,5}$=hat $d_{2,1}$. If $d_{b1} > d_{6,3}$, the number of terms for which the arithmetic mean is to be calculated is further increased. The monotonic regression is explained in more detail on page 102 and on in the Reference Document described above.

When the monotonically transformed hat $d_{ij}$ are obtained, "stress" S is calculated according to the following expression.

$$S = \sqrt{\frac{\sum_{i<j}(d_{ij} - \hat{d}_{ij})^2}{\sum_{i<j} d_{ij}^2}} \quad (3)$$

In step 510, it is determined whether the stress S has converged, i.e., whether the change of the value of the stress S from that in the previous loop is smaller than a predetermined value. If it is determined that the stress S has not converged, in step 512, the spatial configuration is updated by a steepest descent method.

In the steepest descent method, a gradient of the stress S with respect to the change of the spatial configuration is calculated, and the spatial configuration in the opposite direction from the gradient direction, i.e., the direction in which the stress S decreases most, is chosen. The simplest way is to use the Newton method in numerical calculation. A more detailed explanation is found on page 107 and on in the above-described Reference Document. Alternatively, the method described in the following document may be used: J. W. Sammon, "A nonlinear mapping for data structure analysis", IEEE Transactions on Computers, C-18(5): 401-409 (1969).

When the spatial configuration is updated by the steepest descent method, in step 506, the distances $d_{ij}$ between the vectors are calculated according to the updated spatial configuration. Next, in step 508, hat $d_{ij}$ are calculated from $d_{ij}$ using the monotonic regression as described above, and the stress S is calculated from these $d_{ij}$ and hat $d_{ij}$ using the expression (3).

In step 510, it is again determined whether the stress S has converged, and if the difference between the value of the stress S calculated this time and that calculated previously is smaller than a predetermined value, it is concluded that the stress S has converged, and the process proceeds to step 514.

In step 514, mapping information is determined based on the spatial configuration $d_{ij}$ thus obtained. Specifically, the above-described feature vectors $X^{(i)}$ (i=1 . . . N) include a feature vector of the user and feature vectors of the respective islands. Accordingly, the mapping information refers to an arrangement of these feature vectors $X^{(i)}$ (i=1 . . . N) in the two-dimensional space such that the distances between the feature vector $X^{(i)}$ and the feature vectors $X^{(i)}$ correspond to $d_{ij}$.

Figure 6:
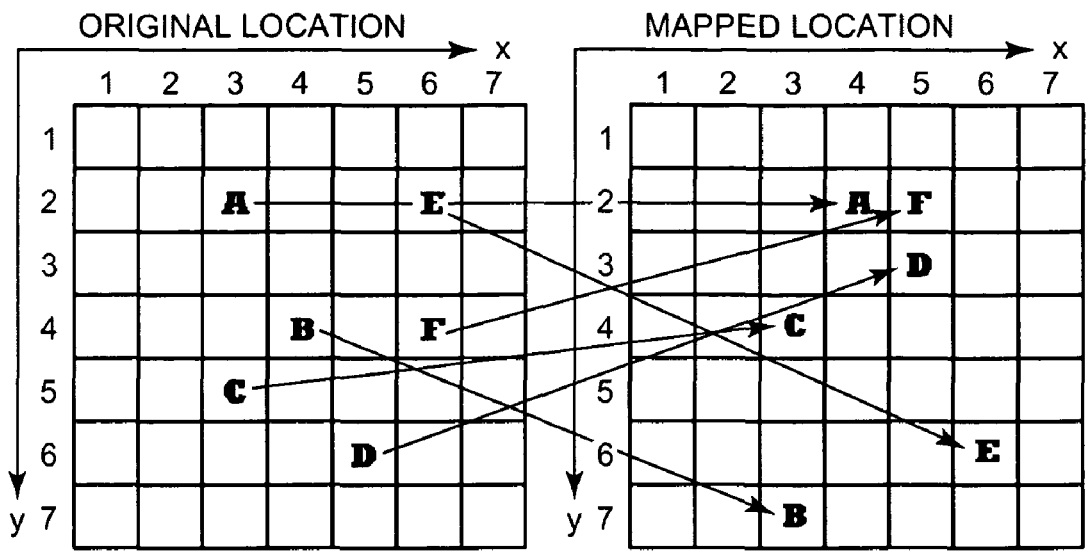
FIG. 6 shows how the islands are mapped from the original positions.

FIG. 6 graphically shows an example of such mapping processing. In FIG. 6, the left side indicates the original location of islands A, B, C, D, E, and F. In the original location, the island A is at coordinates (2,2), the island B is at coordinates (4,4), and so on. The original location corresponds to the arrangement of the islands provided to all the users when the present invention is not applied.

In FIG. 6, the right side indicates the location of the islands mapped from the original location, based on the mapping information generated for a specific user through the processing shown in FIG. 5. In the mapped location, as shown, the island A, which was at coordinates (2, 2) in the original location, is mapped to coordinates (4, 2). The island D, which was at coordinates (5, 6) in the original location, is mapped to coordinates (5, 3), and so on. The mapping information is stored as mapping information 406 in the map server 124 and, upon login of the particular user to the virtual world system, the virtual world is presented to the user via the map server 124 based on the mapped location of the islands, instead of the original location.

Figure 7:
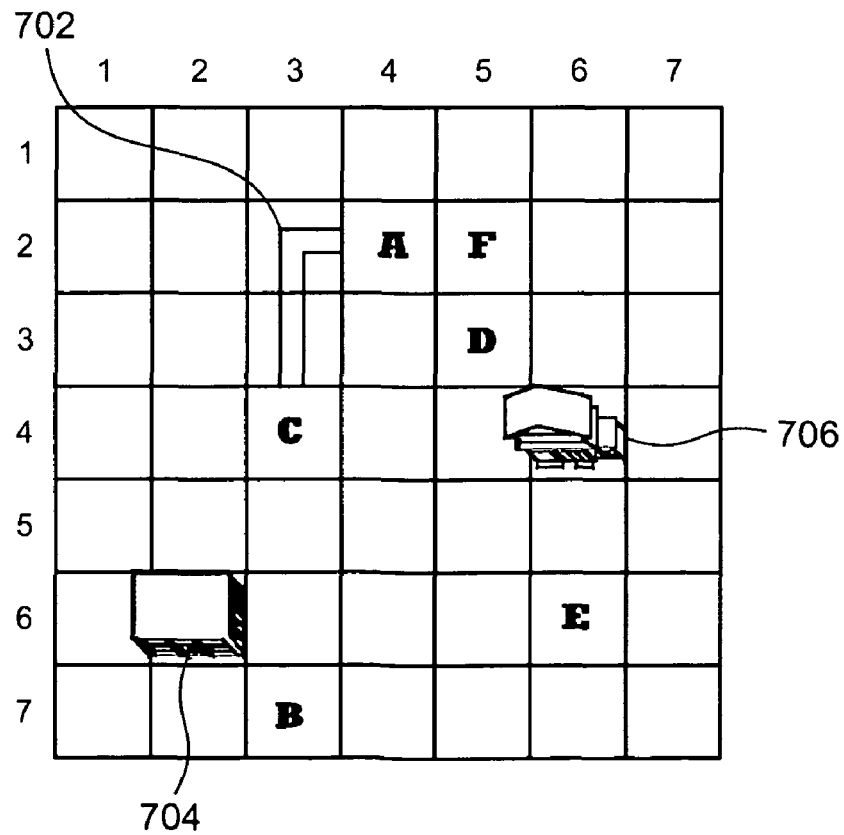
FIG. 7 shows an example of a mapped virtual space.

FIG. 7 basically corresponds to the mapped location shown on the right side of FIG. 6. As an additional feature of this example, a passage 702 and additional objects 704 and 706 are added to the places where islands are not mapped. Such addition of objects to the vacant areas in the mapped location is provided by the map server 124 as additional information to the mapping information, in response to a request from the user, or by another optional function.

The map server 124 may prepare the objects to be added. Each user may add any of them to the virtual space provided according to the mapping information specific to the user.

Figure 8:
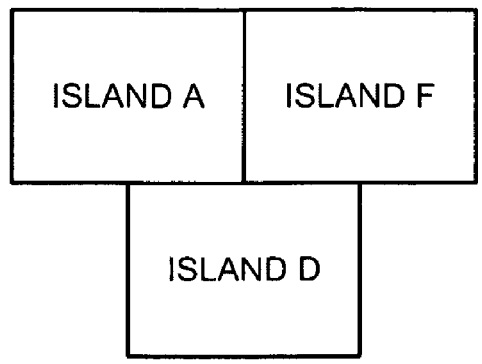
FIG. 8 shows an example of location of neighboring islands.

Further, at the time of mapping, the map server 124 may arrange the neighboring islands in slightly offset positions, as shown in FIG. 8, so that the user can readily move from one island D to the neighboring island A or F, for example.

The contents that the user's client computer renders on the screen upon login of the user into the virtual space are generally provided through one of the mapping information 406a to 406c stored in the map server 124 corresponding to that user. That is, in the case where the contents to be displayed on the screen of the client computer only relate to the objects and/or events inside the island where the avatar of the user is now staying, the client computer is directly connected to the server related to that island as shown e.g. in FIG. 1, with the map server 124 being passed through, in which case the mapping information is not particularly used. On the other hand, even if the avatar is on a certain island, if the avatar can see the neighboring islands or if the avatar is on the road bridging the islands or flying in the sky, the information of a plurality of islands is necessary for the client computer to render them, so that the mapping information for mapping the positional relationship between the islands is used. At this time, the map server 124 detects related islands from the mapping information as well as from the avatar's field of view, and queries the servers of the corresponding islands. It then combines the obtained information as necessary, and transfers the resultant information to the client computer.

A specific example of the arrangement of the islands according to the multidimensional scaling will now be explained from another point of view, using a simple example. For convenience of explanation, the number of islands is set to "5". Here, the feature vector of the user is represented as X, and the feature vectors of the islands are represented as A, B, C, D, and E. The following table 1 shows the Euclidean distances between the feature vectors calculated using the above-described expression (1).

TABLE 1

|   | X    | A    | B    | C    | D    | E    |
|---|------|------|------|------|------|------|
| X | 0.0  | 1.5  | 2.5  | 1.6  | 23.1 | 25.4 |
| A | 1.5  | 0.0  | 1.0  | 2.2  | 21.7 | 24.0 |
| B | 2.5  | 1.0  | 0.0  | 3.0  | 20.5 | 23.0 |
| C | 1.6  | 2.2  | 3.0  | 0.0  | 22.7 | 25.1 |
| D | 23.1 | 21.7 | 20.5 | 22.7 | 0.0  | 2.4  |
| E | 25.4 | 24.0 | 23.0 | 25.1 | 2.4  | 0.0  |

As seen from this table, the islands A, B, and C are relatively close to the hobbies and preference of the user, while the islands D and E are relatively far therefrom.

Figure 9:
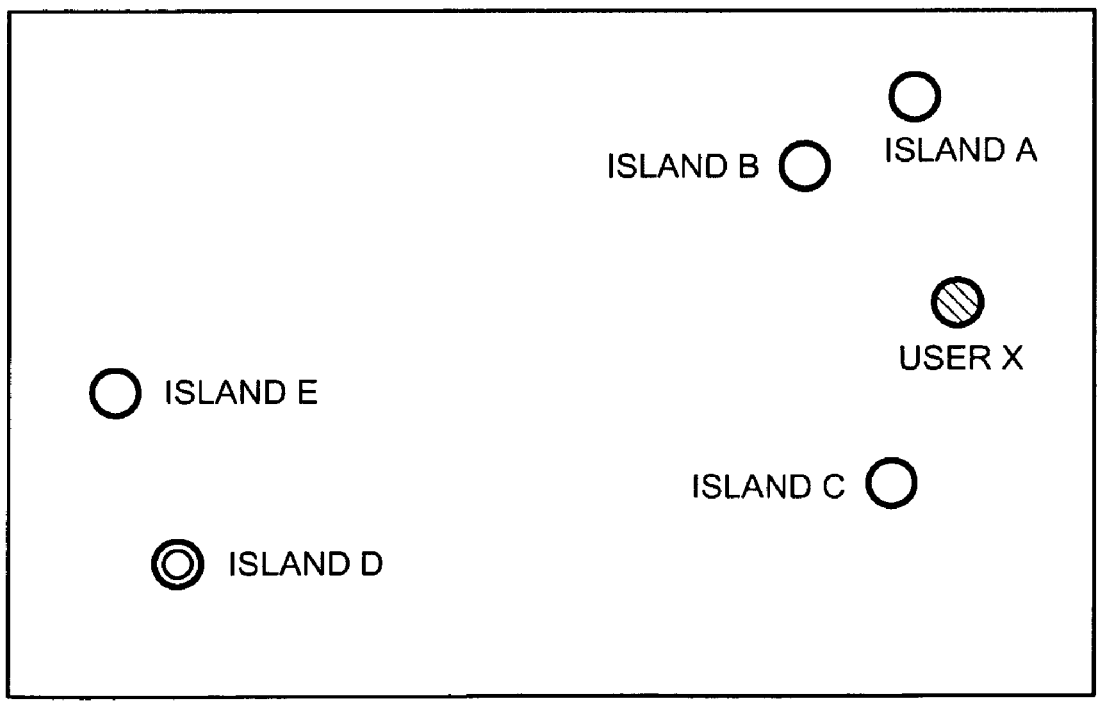
FIG. 9 shows relative location of the user and the islands in mapped location.

FIG. 9 shows, by way of example, the six feature vectors in Table 1 arranged in a two-dimensional space according to multidimensional scaling. As seen from the figure, the islands A, B and C relatively close to the user's hobbies and preference are physically located relatively close to the user X, while the islands D and E relatively far from the user's hobbies and preference are physically located relatively far from the user X.

Such location is achieved because the configuration diagram generated by the multidimensional scaling holds the order of the distances between the feature vectors before the number of dimensions is reduced. This means that, from the standpoint of the user X, the location keeps the distance relationship reflecting the user's hobbies and preference. Thus, by applying the positional relationship between the vectors with the user as the base point as it is to the relocation of the islands in the virtual space, the relationship between the neighboring islands reflecting the user's interest can be established. The mapped position of the user X preferably corresponds to the initial position when the user X logs into the virtual space, which allows the user X to see and visit the islands the user is interested in, immediately after the login.

Figure 10:
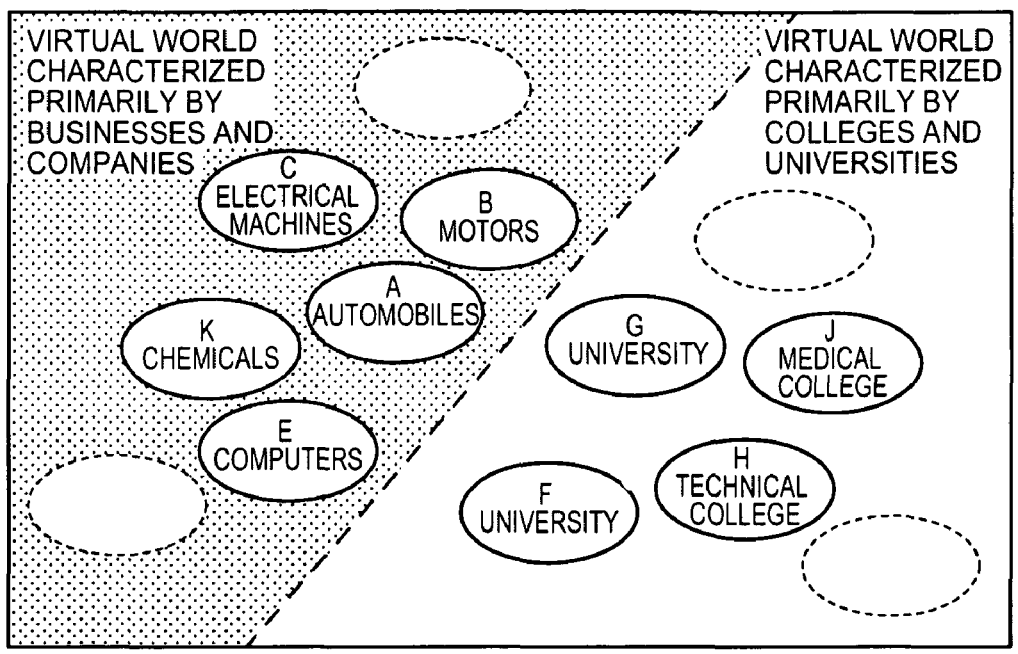
FIG. 10 shows globally mapped location of the islands.

FIG. 10 shows the location of the islands mapped according to the present invention in the virtual space more globally than in FIG. 9. As seen from FIG. 10, according to the present invention, the area including the islands primarily related to businesses and companies and the area including the islands primarily related to colleges and universities, for example, appear as separate clusters.

Figure 11:
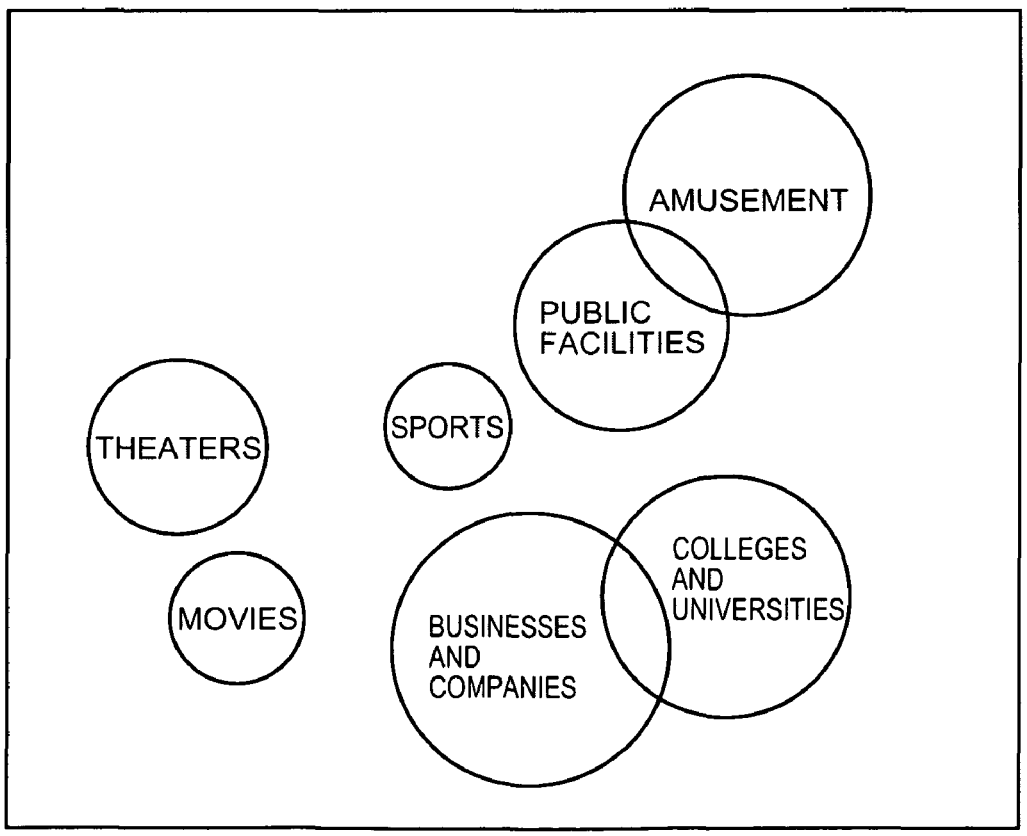
FIG. 11 shows more globally mapped location of the islands.

FIG. 11 shows the location of the islands mapped according to the present invention in the virtual space still more globally than in FIG. 10. As seen from FIG. 11, according to the present invention, the islands belonging to similar categories are clustered globally in response to the user's feature vector. When the user visits an island of a specific category, there are a large number of neighboring islands that attract the user's attention. This saves the user the trouble of looking for an interesting island in a visual manner or the like, thereby considerably increasing the convenience of the virtual space.

While the values of the feature vector for each user are determined initially when the user has an account in the virtual world for the first time, the user's profile may change over time, and above all, the event information on the islands and the like change by the minute, so that it is desirable that the mapping information be updated as appropriate. To this end, the map server 124 updates the mapping information 406 for each user by the map calculation module 408, using the user profile 402 and the island information 404, regularly or in response to detection of a new event on an island.

Further, in the above embodiment, the feature vector of each user, generated from the user's profile and preference, and the feature vectors of the respective islands, including the profiles and event information of the islands, are subjected to multidimensional scaling to generate mapping information specific to the user to be mapped in two dimensions, and the mapping information specific to the user is used when the user logs in. Alternatively, it is possible to prepare a plurality of pieces of typical and recommendable mapping information (e.g., for classical music funs, for soccer funs, and so on) to allow the user to chose one of them at the time of login.

Furthermore, although the Kruskal method is used among the multidimensional scaling methods for generating the mapping information in the above embodiment, the present invention may use any techniques called nonmetric multidimensional scaling among the multidimensional scaling methods. For the nonmetric multidimensional scaling, besides the above-described Kruskal method, Shepard method and Guttman method are known, which are also usable for the present invention.

The invention claimed is:

1. A computer-implemented virtual space system for dynamically generating a plurality of partial virtual spaces that a plurality of client computers access from a plurality of servers having processing devices, said virtual space system comprising:
a login server for client login;
at least one data server for storing and updating user profile information and profiles of said partial virtual spaces;
at least one map server comprising means for calculating distances representing similarity relationships between a first feature vector comprising a user profile with user preferences for a user of a client computer and each of a plurality of second feature vectors including profiles of said partial virtual spaces and means for generating mapping information defining location of said partial virtual spaces relative to a user avatar so as to keep the order of the distances calculated and to provide mapping information to at least one partial virtual space server, wherein the distances $\delta_{i,j}$ between vectors i and j are calculated by $$\delta_{ij} = \sqrt{\sum_{d=1}^{m} \left(X_d^{(i)} - X_d^{(j)}\right)^2} \quad (1)$$

where m is the number of dimensions of the feature vectors, and $X^{(i)}$ and $X^{(j)}$ are the first and second feature vectors; and
a plurality of partial virtual space servers for each of a plurality of partial virtual spaces, said partial virtual space servers comprising means for presenting said partial virtual spaces to said client computer based upon said mapping information generated whereby said client computer dynamically renders display of the partial virtual spaces for the user based on the user preferences.

2. The system according to claim 1, further comprising:
means for preparing said first feature vector for each user of said client computers;
means for storing said mapping information for each user; and
means, in response to access of said user to said virtual space system, for selecting the mapping information corresponding to said user, wherein
said partial virtual spaces are presented to said client computer of said user based upon the location defined by said selected mapping information.

3. The system according to claim 1, wherein the location of said partial virtual spaces is determined by multidimensional scaling.

4. The system according to claim 3, wherein the location of said partial virtual spaces is determined by Kruskal method.

5. A computer-implemented method for operating a virtual space system for dynamically generating a plurality of partial virtual spaces that a plurality of client computers access when implemented on a plurality of servers having processing devices said method comprising the steps of:

having a login server for client login;

and at least one data server for storing and updating user profile information and profiles of said partial virtual spaces, calculating distances representing similarity relationships between a first feature vector including a profile with user preferences of a user of a client computer and each of a plurality of second feature vectors including profiles of said partial virtual spaces, respectively, wherein the distances $\delta_{ij}$ between vectors i and j are calculated by $$\delta_{ij} = \sqrt{\sum_{d=1}^{m} (X_d^{(i)} - X_d^{(j)})^2} \quad (1)$$

where m is the number of dimensions of the feature vectors, and $X^{(i)}$ and $X^{(j)}$ are the first and second feature vectors;

generating mapping information defining location of said partial virtual spaces relative to a user avatar so as to keep the order of the distances calculated and providing mapping information to at least one virtual space server; and at least one virtual spacer server presenting said partial virtual spaces to said client computer based upon said mapping information generated whereby said client computer dynamically renders display of partial virtual spaces for the user based on the user preferences.

6. The method according to claim 5, further comprising the steps of:

preparing said first feature vector for each user of said client computers;

storing said mapping information for each user in storage means of said virtual space system; and in response to access of said user to said virtual space system, selecting the mapping information corresponding to said user, wherein said partial virtual spaces are presented to said client computer of said user based upon the location defined by said selected mapping information.

7. The method according to claim 5, wherein the location of said partial virtual spaces is determined by multidimensional scaling.

8. The method according to claim 7, wherein the location of said partial virtual spaces is determined by Kruskal method.

9. The method according to claim 7, further comprising applying spatial configuration to $\delta_{i,j}$ and obtaining a $d_{ij}$ for each partial virtual space, wherein $d_{ij}$ is the distance between vectors after application of the spatial configuration.

10. The method according to claim 9, wherein the mapping information comprises an arrangement of feature vectors $X^{(i)}$ (i =1 . . . N) in two-dimensional space such that the distances between the feature vector $X^{(i)}$ and the feature vectors $X^{(j)}$ correspond to $d_{ij}$.

* * * * *